United States Patent [19]

Buck

[11] Patent Number: 4,497,498
[45] Date of Patent: Feb. 5, 1985

[54] EXPANDING-CONTRACTING GRIPPING DEVICE FOR WORKPIECE

[76] Inventor: James R. Buck, 1902 SE. 36th St., Cape Coral, Fla. 33904

[21] Appl. No.: 405,793

[22] Filed: Aug. 6, 1982

[51] Int. Cl.³ .............................................. B23B 31/40
[52] U.S. Cl. .................................. 279/2 R; 242/72 R; 242/72.1
[58] Field of Search .................. 279/2 R, 4; 242/68.2, 242/72, 72.1

[56] References Cited

U.S. PATENT DOCUMENTS

| | | | |
|---|---|---|---|
| 2,573,928 | 11/1951 | Peter | 279/2 |
| 2,734,749 | 2/1956 | Benjamin | 279/2 |
| 2,775,093 | 7/1956 | Peter et al. | 279/2 |
| 2,819,090 | 1/1958 | Stenberg | 279/2 |
| 2,859,041 | 11/1958 | Sloan | 279/2 |
| 2,998,258 | 8/1961 | Ambrose | 279/41 |
| 3,111,329 | 11/1963 | Ruehl | 279/2 |
| 3,117,797 | 1/1964 | Buck | 279/2 |
| 3,357,709 | 12/1967 | Buck | 279/2 |
| 3,357,710 | 12/1967 | Buck | 279/2 |
| 3,362,721 | 1/1968 | Buck | 279/2 |
| 3,534,970 | 10/1970 | Glimpel | 279/2 |
| 3,731,942 | 5/1973 | Buck | 279/4 |
| 3,921,993 | 11/1975 | Ingham et al. | 279/2 R X |

FOREIGN PATENT DOCUMENTS 6983 of 1910 United Kingdom ................ 408/228

OTHER PUBLICATIONS

Extended Range Tap Collect, Universal Houdell Catalog, TH-82, 12-1982, p. 79.

Primary Examiner—William R. Briggs
Assistant Examiner—Glenn L. Webb
Attorney, Agent, or Firm—Flynn, Thiel, Boutell & Tanis

[57] ABSTRACT

A device for releasably gripping a workpiece includes first and second axially elongated, cylindrical gripping sleeves, the second sleeve being coaxially supported within the first sleeve for axial movement relative thereto. Each sleeve includes a plurality of circumferentially spaced, axially extending segments, each connected at opposite ends to respective adjacent segments by relatively short integral webs. The radially outer surface of the first sleeve and the radially inner surface of the second sleeve are relatively smooth cylindrical surfaces. A plurality of axially spaced ramps are provided on the radially inner surface of each segment of the first gripping sleeve and on the radially outer surface of each segment of the second gripping sleeve. The ramps on the inner sleeve slidably engage respective ramps on the outer sleeve so that relative axial movement therebetween effects relative radial movement therebetween. A spring cooperable with the gripping sleeves urges relative axial movement therebetween.

18 Claims, 13 Drawing Figures

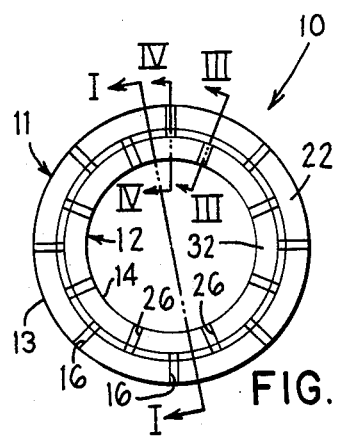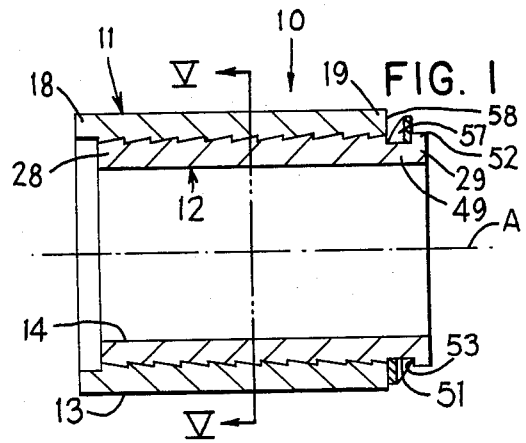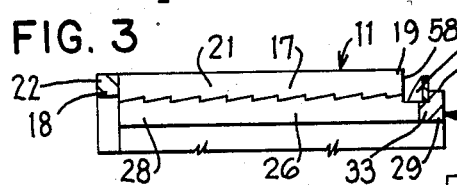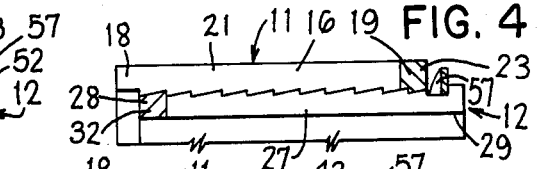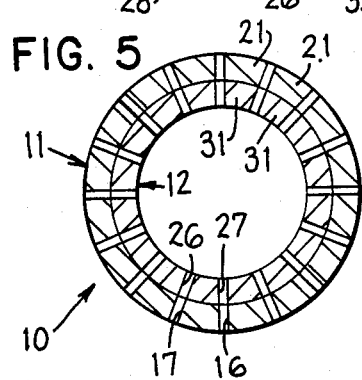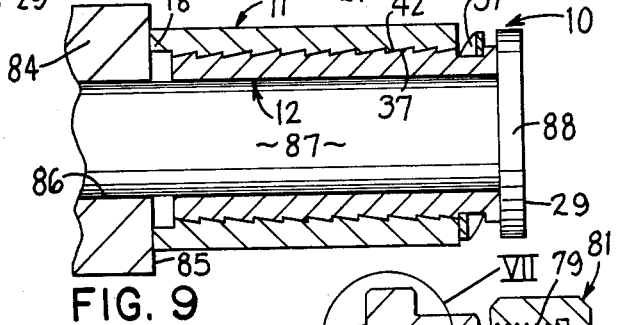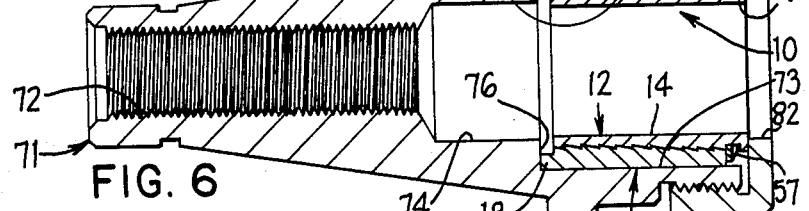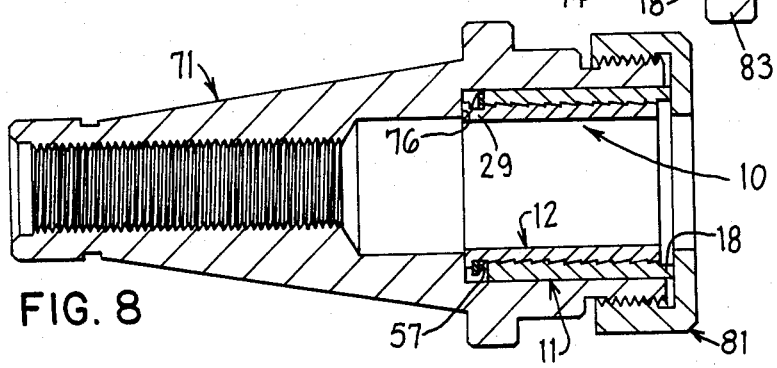

EXPANDING-CONTRACTING GRIPPING DEVICE FOR WORKPIECE

FIELD OF THE INVENTION

This invention relates to a device for releasably gripping a workpiece and, more particularly, to a collet which may be used either as a radially expandable mandrel for releasably gripping a bore in a workpiece or as a radially contractable sleeve for releasably gripping the shank of a workpiece.

BACKGROUND OF THE INVENTION

A number of devices, specifically collets and mandrels, have previously been developed which are adapted to grip a workpiece or tool through radial expansion or contraction. Devices of this type are disclosed, for example, in U.S. Pat. Nos. 3,117,797, 3,357,709, 3,357,710, 3,362,721 and 3,731,942. None of these known devices, however, can be utilized for both expansion and contraction. Further, each of these devices is formed as an axially split sleeve having axially extending rows of ramplike cams provided circumferentially therearound, which cams cooperate with similar fixed cams on the workpiece holder, whereby these devices hence require a special and expensive workpiece holder designed specifically for cooperation therewith. Moreover, each of these arrangements is constructed in a manner which renders it tedious to adapt it to grip a workpiece shank or bore of a different size.

U.S. Pat. No. 2,573,928 discloses an arrangement employing axially aligned series of inner and outer rings having cooperating tapered surfaces therebetween, which arrangement may be used for applications requiring either expansion or contraction. U.S. Pat. No. 2,734,749 discloses a similar structural arrangement. However, neither arrangement has been satisfactory in all respects. In particular, the expanding and contracting rings cannot be quickly interchanged with like elements of a slightly different size in order to adapt the arrangement for use with a workpiece shank or bore of a different size, because the arrangement consists of a plurality of separate rings which must be carefully placed in a precise axial and radial relationship with respect to each other during assembly and are not interconnected in any manner which would retain them in this relationship when disassembled. In addition, actuation and release of the device are in practice effected by axial movement of the rings with a "ripple" effect, and the radial movement is therefore not always uniform along the axial length of the device and a release is not always prompt and complete. Moreover, the requisite axial movement of the rings during actuation typically effects axial movement of the workpiece, which in many applications is not desirable.

Accordingly, an object of the present invention is to provide an improved device for gripping a workpiece or tool which can be utilized both in applications requiring radial expansion (such as a mandrel) to grip a bore in the workpiece and in applications requiring radial contraction (such as a collet) to grip a shank of the workpiece, and which will cooperate with smooth, cylindrical surfaces on both the workpiece and the holder.

A further object of the invention is to provide a device, as aforesaid, which can be quickly and easily interchanged with like units to facilitate gripping of different size workpiece shanks and bores, and which can be arranged to provide either some axial movement or no axial movement of the workpiece during expansion or contraction.

A further object of the invention is to provide a device, as aforesaid, which can be actuated smoothly and rapidly, which provides uniform radial movement along its axial length, and which provides a dependable and complete release.

A further object of the invention is to provide a device, as aforesaid, which is relatively simple and inexpensive to manufacture and assemble, is relatively light, is rugged, and requires little or no maintenance.

SUMMARY OF THE INVENTION

The objects and purposes of the invention, including those set forth above, are met by providing a device for releasably gripping a workpiece which includes outer and inner axially elongated, sleevelike gripping members, the inner gripping member being coaxially supported within the outer gripping member for axial movement relative thereto. The outer gripping member is radially expandable and the inner gripping member is radially contractable. A plurality of axially spaced ramps are provided on the radially inner surface of the outer gripping member and on the radially outer surface of the inner gripping member, each ramp having a camming surface thereon which extends at an acute angle with respect to the longitudinal axis of the gripping members. The camming surface on each ramp of the outer gripping member slidingly engages the camming surface on a respective ramp on the inner gripping member so that relative axial movement between the gripping members in a first direction effects relative radial movement of the gripping members.

Each of the gripping members is preferably a substantially cylindrical sleeve and comprises a plurality of circumferentially spaced, axially extending segments which are connected at opposite ends to a respective one of the adjacent segments by a relatively short, integral web. The radially outer surface of the outer sleeve and radially inner surface of the inner sleeve are substantially smooth, cylindrical surfaces.

In a preferred embodiment, one end of the outer gripping member extends axially beyond the associated end of the inner gripping member, and the other end of the inner gripping member extends axially beyond the other end of the outer gripping member. A radially inwardly extending flange is provided on the projecting end of one gripping member and a wave spring is disposed between the flange and the adjacent end of the other gripping member to relatively urge the gripping members in a release direction.

BRIEF DESCRIPTION OF THE DRAWINGS

FIG. 1 is a sectional view taken along line I—I of FIG. 2 of a dual-sleeve tool gripping device embodying the present invention.

FIG. 2 is an end view of the gripping device of FIG. 1.

FIG. 3 is a sectional view taken along the line III—III of FIG. 2.

FIG. 4 is a sectional view taken along the line IV—IV of FIG. 2.

FIG. 5 is a sectional view taken along the line V—V of FIG. 1.

FIG. 6 is a central sectional side view of a tool holder having the gripping device of FIG. 1 mounted therein.

FIG. 8 is a view which is identical to that of FIG. 6, but with the gripping device reversed end-for-end.

FIG. 9 is a sectional side view of a tool holder which includes a draw rod having the gripping device of FIG. 1 supported thereon.

Figure 7:
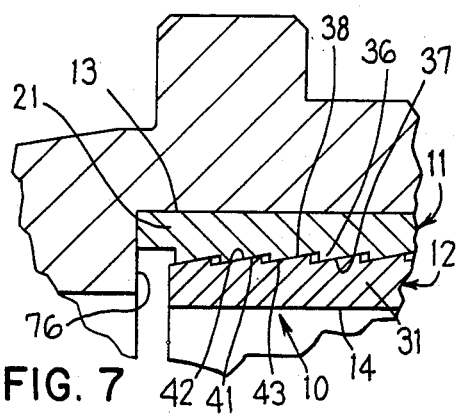
FIG. 7 is an enlarged view of the indicated portion of the apparatus illustrated in FIG. 6.

Certain terminology will be used in the following description for convenience in reference only and will not be limiting. The words "up", "down", "right" and "left" will designate directions in the drawings to which reference is made. The words "in" and "out" will respectively refer to directions toward and away from the geometric center of the illustrated device and designated parts thereof. Such terminology will include the words specifically mentioned, derivatives thereof and words of similar import.

DETAILED DESCRIPTION

Referring to FIGS. 1 and 2, a dual-sleeve gripping device 10 includes a cylindrical outer gripping sleeve 11 (i.e. a mandrel) and a cylindrical inner gripping sleeve 12 (i.e. a collet), the sleeve 12 being coaxially slidably supported within the sleeve 11. The outer sleeve 11 has a smooth, cylindrical outer surface 13 and the inner gripping sleeve 12 has a smooth, cylindrical inner surface 14.

The outer gripping sleeve 11 has a plurality of axially extending slots 16 and 17 therein. The slots 16 extend slightly less than the full length of the sleeve 11 from one end 18 thereof, and the slots 17 extend slightly less than the full length of the sleeve 11 from the other end 19 thereof. As shown in FIG. 2, the slots 16 are circumferentially spaced at equal intervals and, as shown in FIG. 5, a slot 17 is provided intermediate each pair of adjacent slots 16.

Thus, as shown in FIGS. 3–5, the outer sleeve 11 is made up of a plurality of circumferentially spaced, axially extending segments 21 each connected at the end 18 thereof to one of the two adjacent segments 21 by an integral web 22 and connected at the end 19 thereof to the other of the adjacent segments 21 by an integral web 23.

In a similar manner, the inner gripping sleeve 12 has slots 26 and 27 which extend almost the full length thereof from the ends 28 and 29 thereof, respectively, and which are arranged in a circumferentially alternating manner, thereby defining a plurality of circumferentially spaced, axially extending segments 31, each connected at opposite ends to a respective one of the adjacent segments 31 by integral webs 32 and 33.

Referring to FIG. 7, each of the axially extending segments 21 of the outer gripping sleeve 11 has a plurality (i.e. a row) of axially spaced ramps 36 on the radially inner surface thereof. Each ramp 36 has a planar camming surface 37 thereon which is arranged at a small acute angle with respect to the axis A of the sleeve 11, and has a planar stop surface 38 thereon which is shorter than the camming surface 37 and is approximately perpendicular to the axis of the sleeve 11.

Similarly, a plurality of axially spaced ramps 41 are provided on the radially outer surface of each of the axially extending segments 31 of the inner gripping sleeve 12. Each of the ramps 41 has a planar camming surface 42 and a stop surface 43, the surfaces 42 and 43 respectively extending substantially parallel to the surfaces 37 and 38 on the ramps 36. Each of the camming surfaces 37 on the outer sleeve 11 slidably engages a respective camming surface 42 on the inner gripping sleeve 12. Engagement of the stop surfaces 38 and 43 will limit rightward movement (in FIG. 7) of the inner sleeve 12 relative to the outer sleeve 11.

Referring to FIG. 1, the end 29 of the inner gripping sleeve 12 defines an annular end portion 49 which projects axially beyond the outer sleeve 12. This end portion 49 has an outwardly opening, annular groove 51 formed therein. This groove 51 is axially bounded by a radially outwardly extending flange 52 which defines an axially facing shoulder 53. An annular wave spring 57 is disposed in groove 51 and encircles the inner gripping sleeve 12 and engages the axially facing shoulder 53 and the axially opposed end surface 58 of the outer gripping sleeve 11. The spring 57 thus yieldably urges the inner gripping sleeve 12 to move rightwardly in FIG. 1 relative to the outer gripping sleeve 11 into a release position. The natural resiliency of the sleeves 11 and 12, acting onto the camming surfaces in a radially inward direction, also produces a force urging the inner sleeve 12 rightwardly in FIG. 1 relative to the outer sleeve 11.

A tool holder 71 is illustrated in FIG. 6 and includes a housing having a threaded bore 72 in one end thereof and coaxially aligned, smooth cylindrical bore 73 in the other end thereof, which bore 73 extends only part way through the holder 71. The diameter of the bore 73 is substantially equal to the outside diameter of the outer sleeve 11 when it is in its released or nonexpanded condition, and its axial length is slightly less than the overall axial length of the gripping device 10. The device 10 functions as a collet and is positionable within the bore 73. A bore 74 of lesser diameter is provided at the inner end of the bore 73, thereby defining an axially facing annular shoulder 76. The diameter of the bore 74 is preferably equal to or slightly greater than the inside diameter of the inner sleeve 12 when it is in its released or noncontracted condition. The end of the holder 71 having the bore 73 therein is externally threaded at 79, and a cap 81 is threadedly engaged therewith. This cap 81 has a central opening 82 therethrough, the diameter of which is equal to or slightly greater than the inside diameter of the inner gripping sleeve 12. The inner surface of the cap 81 thus slidingly engages the end 29 of the inner gripping sleeve 12.

The holder 71 also has a radially outwardly extending flange 83 thereon provided with a pair of conventional slots (not shown) for driving engagement with lugs or dogs.

FIG. 8 illustrates a tool holder which is identical to that illustrated in FIG. 6 except that the gripping device or collet 10 has been reversed end-for-end so that the end 29 of the inner gripping sleeve is disposed against the shoulder 76 and the end 18 of the outer gripping sleeve slidably engages the cap 81.

FIG. 9 illustrates a tool holder which includes a housing 84 having an end surface 85 with a cylindrical bore 86 therein. A draw rod 87 is slidingly supported in the bore 86 and has a radially outwardly extending annular flange 88 at the outer end thereof. The gripping device 10 of FIG. 1 is supported on the draw rod 87, the outside diameter of the draw rod 87 being substantially equal to the inside diameter of the inner gripping sleeve 12 when it is in its released or noncontracted condition. The end 18 of the gripping sleeve 11 is disposed against the end surface 85 of the housing 84, and the end 29 of the inner gripping sleeve 12 is disposed against a side surface of the radial flange 88. The outside diameter of the radial flange 88 is slightly less than the outside diameter of the outer gripping sleeve 11.

The gripping device 10 can be reversed end-for-end on the draw rod 87 in a not illustrated manner, the end 29 of the inner gripping sleeve 12 being disposed against the housing surface 85 and the end 18 of the outer gripping sleeve 11 being disposed against the side surface of the flange 88.

Figure 10:
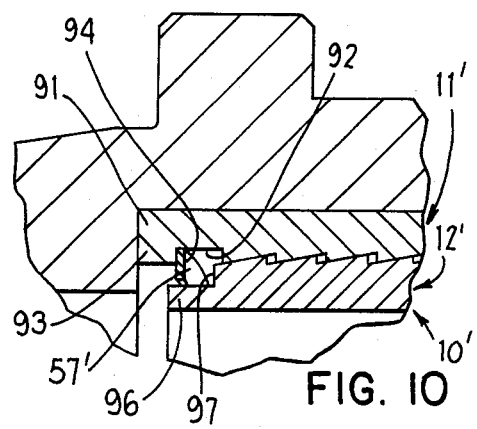
FIG. 10 is a view similar to FIG. 7 which illustrates an alternative embodiment of the gripping device of FIG. 1.

FIG. 10 illustrates part of a dual-sleeve gripping device 10' which differs from the device 10 only in that the spring 57' is mounted on the outer sleeve inside the device, rather than on the inner sleeve outside the device as in FIG. 1. More specifically, the outer gripping sleeve 11' has an annular end portion 91 which projects axially beyond the adjacent end of the inner sleeve 12', which end portion 91 has an undercut groove 92 therein. The outer end of the portion 91 has a radially inwardly extending flange 93 which defines an axially facing shoulder 94. The adjacent end of the inner sleeve 121 has a portion 96 which is of reduced outside diameter and is aligned with the groove 92, thereby defining an axially facing shoulder 97. The annular wave spring 57' is supported within the groove 92 and operatively engages the axially facing shoulders 94 and 97 to yieldably urge the inner gripping sleeve 12' rightwardly relative to the outer gripping sleeve 11' toward a release position.

The gripping device 10' of FIG. 10 is the preferred embodiment as the spring 57' is provided inside the double sleeve and is typically positioned at the closed end of the bore in a tool holder. Thus, it is less likely the spring 57' will be damaged, and the spring 57' is also protected from dirt and cuttings from the machine tool.

Figure 12:
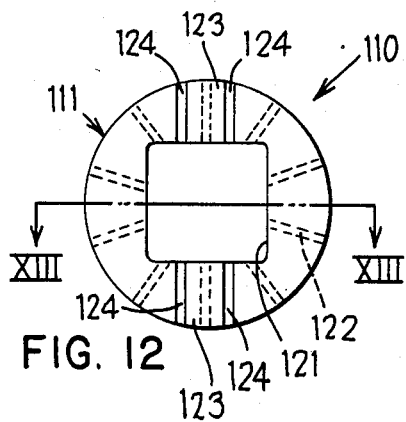
FIG. 12 is an end view of the device shown in FIG. 11.
Figure 11:
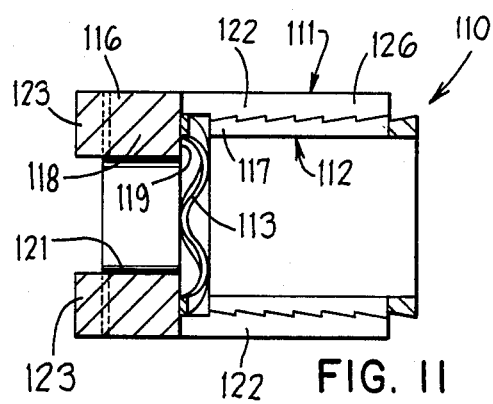
FIG. 11 is a central sectional side view of a further alternative embodiment of the gripping device of FIG. 1.
Figure 13:
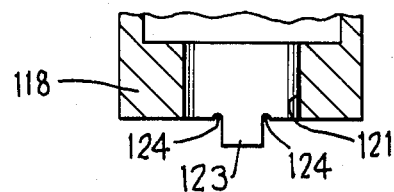
FIG. 13 is a fragmentary sectional view taken along line XIII—XIII of FIG. 12.

FIGS. 11 to 13 illustrate a third embodiment of a dual-sleeve gripping device or collet 110 which is particularly desirable for gripping a tap to permit performance of a threading operation. This device 110 is generally similar to the device 10 of FIG. 1, and includes an outer sleeve 111, an inner sleeve 112 and a wave spring 113.

The end 116 of the outer sleeve 111 projects substantially beyond the adjacent end 117 of the inner sleeve 112, and has a radially inwardly extending flange 118 which defines an axially facing shoulder 119. The annular wave spring 113 is disposed between and operatively engages the shoulder 119 and the adjacent end surface on the inner sleeve 112, and yieldably urges the inner sleeve 112 to move rightwardly in FIG. 11 relative to the outer sleeve 111. The inner edge of the flange 118 defines a noncircular (i.e., a square) opening 121 which extends coaxially through the end flange 118. The circumferentially spaced, axially extending slots 122 in the outer sleeve 111 extend almost the full length thereof, but only from the end 126 thereof remote from the end 116. If desired, an axially extending blind slot, that is, a slot which does not extend to either end of the sleeve 111, can be provided between each adjacent pair of slots 122.

Two drive lugs 123 are provided on diametrically opposite sides of the opening 121 and project axially outwardly from the rearward end of flange 118. Spaced, approximately radially extending grooves 124 are provided on opposite sides of each of the lugs 123.

Other than the above, the outer sleeve 111 otherwise corresponds to the sleeve 11 and the inner sleeve 112 corresponds to the sleeve 12, both as described above relative to FIGS. 1–5.

OPERATION

Referring to FIGS. 6 and 7, the holder 71 is mounted on a not illustrated machine tool in a conventional manner by screwing a threaded shaft on the machine tool into the threaded bore 72. A conventional driving lug may be used in conjunction with the slots in the flange 83 to tighten the holder 71 onto the threaded shaft. If the double-sleeve collet 10 is not mounted on the holder 71, then cap 81 is removed. The collet 10, in its assembled but nonstressed condition as illustrated in FIG. 1, is slid into the bore 73. Cap 81 is then remounted on the holder and initially rotated sufficient to contact and slightly axially displace the inner sleeve 12. This causes the outer sleeve 11 to tend to expand so that it tightly grips the wall of bore 73 so as to securely hold the collet 10 within the holder 71.

A cylindrical shank on a not illustrated workpiece is then inserted through the cap opening 82 into the bore 14 of the collet, and the cap 81 is rotated, for example by a spanner wrench, so that it moves leftwardly in FIG. 6. The cap 81 thus forces the inner gripping sleeve 12 to move leftwardly in FIG. 6 against the urging of the spring 57. As shown in FIG. 7, the camming surfaces 37 slide along the camming surfaces 42. Since the outer gripping sleeve 11 is prevented from moving radially outwardly by the walls of the bore 73, the inner gripping sleeve 12 contracts radially inwardly until it is firmly gripping the cylindrical shank of the workpiece.

To release the workpiece, the cap 81 is rotated in the opposite direction, the spring 57 and the natural resiliency of the inner sleeve 12 returning the inner gripping sleeve 12 axially and radially to its original position, thereby releasing the shank of the workpiece. Rightward axial movement of the inner sleeve 12 relative to the outer sleeve 11 ceases if the stop surfaces 38 and 43 engage each other, but may also cease before such surfaces engage, depending, for example, on how far the cap 81 is rotated in such opposite direction.

The axial movement of the inner sleeve 12 in the embodiment of FIG. 6 may cause a slight axial movement of the workpiece.

The arrangement illustrated in FIG. 8 operates in substantially the same manner as that of FIG. 6, except that no axial movement of the inner gripping sleeve 12 occurs as it contracts radially inwardly. More specifically, tightening the cap 81 will cause the outer gripping sleeve 11 to move leftwardly in FIG. 8, the outer surface thereof sliding on the walls of the bore 73 and the camming surfaces 37 thereon sliding on the camming surfaces 42 on the inner sleeve 12, causing the segments of the inner sleeve 12 to be deformed radially inwardly into gripping engagement with the shank of the workpiece. Leftward movement of the inner gripping sleeve 12 is prevented by engagement of the end 29 thereof with the axially facing shoulder 76 of the housing 71. When the cap 81 is rotated in the opposite direction, the spring 57 and the natural resiliency of the inner gripping sleeve 12 causes the outer gripping sleeve 11 to move rightwardly to its original position, the inner gripping sleeve 12 simultaneously expanding radially outwardly to its original position.

When a situation arises in which the workpiece to be supported has a different size cylindrical shank, the tool holder in FIGS. 6 and 8 can be quickly adapted by removing the cap 81, sliding the dual-sleeve collet 10 out of the cylindrical bore 73 as a unit, sliding a similar dual-sleeve collet with the same outside diameter but with a larger or smaller inside diameter into the bore 73, and then replacing the cap 81.

Referring now to the tool holder illustrated in FIG. 9, a workpiece having a cylindrical bore therein of slightly greater diameter than the outside diameter of the dual-sleeve collet 10 is moved axially over the collet 10. The draw rod 87 is then moved leftwardly relative to the housing 84 by a conventional and not illustrated mechanism, causing the inner gripping sleeve 12 to be moved leftwardly relative to the outer gripping sleeve 11, the camming surfaces 42 thereon sliding along the camming surfaces 37 on the outer gripping sleeve and causing the segments thereof to be urged radially outwardly into gripping engagement with the cylindrical bore in the workpiece. The outer sleeve 11 does not move axially as it expands radially. The workpiece is removed from this support by returning the draw rod 87 rightwardly to its original position, the inner gripping sleeve 12 moving rightwardly due to the natural resiliency of the outer gripping sleeve 11 and due to the urging of the spring 57, and the segments of the outer gripping sleeve 11 thereby contracting radially inwardly to their original position and out of gripping engagement with the workpiece.

A small amount of axial movement of the outer gripping sleeve 11 can be achieved by reversing the dual-sleeve collet 10 end-for-end on the draw rod 87.

The dual-sleeve collets 10' and 110 (FIGS. 10 and 11, respectively) each operate in substantially the same manner as the collet 10 of FIG. 1, and such operation is therefore not described in detail. The lugs 123 on the collet 110 are each received in a respective and not illustrated recess on the shoulder 76 of the housing 71 of FIG. 6, which housing 71 in this case comprises a rotatable drive spindle, to prevent any relative rotation of the outer sleeve 111 thereof with respect to the housing or spindle 71 while ensuring positive driving of the device 110. The collet 110 is adapted for use with a tool having a noncircular drive on at least a portion of the shank, for example a tap, the noncircular portion of the shank being received in the opening 121 to provide a positive drive between the tap and the device 110, as necessary due to the high torques encountered during threading. At the same time, the inner sleeve 112 of the collet 110 securely grips and supports the tap shank over an extended cylindrical surface area.

In the preferred embodiment, the camming surfaces 37 and 42 on the ramps 36 and 41 preferably extend at an angle of approximately 10° with respect to the longitudinal axis of the sleeve 11 and 12. This angle has the advantage that a relatively high gripping force is produced by a given axial force which urges the sleeves to move relative to each other. Also, the sleeves can be assembled by simply forcing the inner sleeve 12 axially into the outer sleeve 11, the resilient expansion and contraction of the sleeves 11 and 12, respectively, permitting the peaks of the rams 36 and 41 to pass each other. Thus, structure typically used in known devices to facilitate assembly, such as axially extending grooves between the rows of ridges and keys to prevent relative rotation of the sleeves, are unnecessary. It will be recognized, however, that a somewhat greater angle of the camming surfaces 37 and 42 would still be within the scope of the invention. In fact, when an angle of approximately 22° is used, the natural resiliency of the sleeves 11 and 12 is sufficient to effect the necessary relative movement thereof, and the spring 57 can be omitted.

Satisfactory results have been realized with a gripping device 10' (FIG. 10) of approximately the following dimensions. The outer sleeve 11' had an axial length of 1.875 inches, an outside diameter (when relaxed) of 1.5625 inches and an inside diameter (measured at the peaks of the ramps) of 1.25 inches. The inner sleeve 12' had an axial length of 1.875 inches, an outside diameter (measured at the peaks of the ramps) of 1.319 inches and an inside diameter (when relaxed) of 1.010 inches. The inner and outer sleeves, when relaxed, were offset axially by about 0.125 inches so that the overall length of the device 10' was 2.0 inches. Each ramp on each sleeve had an axial length of 0.2 inches and a radial height of 0.0353 inches. The axial length of the portion 96 and of the groove 92 was 0.203 inches and the outside diameter of the portion 96 was 1.1875 inches. The foregoing dimensions, of course, are given by way of example and not by way of limitation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for releasably gripping a workpiece, comprising:
    inner and outer axially elongated, sleevelike gripping members, said inner gripping member being coaxially supported within said outer gripping member for axial movement relative thereto, said outer gripping member being radially resiliently expandable and said inner gripping member being radially resiliently contractable;
    each said gripping member comprising an elongated and substantially cylindrical sleeve, the radially outer surface of said outer gripping member and the radially inner surface of said inner gripping member both being smooth cylindrical surfaces;
    each said gripping member having a plurality of circumferentially spaced slits extending axially from at least one end thereof through an axial extent which is slightly less than the full length of the respective gripping member, said slits extending radially between the inner and outer surfaces of the respective gripping member for dividing each gripping member into a plurality of circumferentially spaced, axially elongated segments which are joined to adjacent segments by relatively short integral webs located at an end of the respective segment, said segments permitting the outer gripping member to resiliently radially expand and the inner gripping member to resiliently radially contract;
    the segments of the outer gripping member having a plurality of axially spaced ramps on the radially inner surface thereof, and the segments of the inner gripping member having a plurality of axially spaced ramps on the radially outer surface thereof, each said ramp on said outer gripping member having a camming surface thereon which slidably engages a camming surface on a respective said ramp on said inner gripping member so that axial movement of one said gripping member relative to the other said gripping member in a first direction effects relative radial movement between the gripping members due to resilient deflection.

2. A device according to claim 1, wherein the ramps are disposed within rows which extend axially of the segments, each said segment having a single row of said ramps extending axially therealong, the rows of ramps on adjacent segments being circumferentially spaced due to the presence of a said slit therebetween, said slit having a circumferential width which is significantly smaller than the circumferential width of the ramps.

3. A device according to claim 2, wherein the individual ramps are of short axial extent, the camming surfaces on the ramps extending at an angle of about 10° relative to the axis of the inner and outer gripping members, and the inner and outer gripping members being axially telescoped one within the other by axially sliding the gripping members together whereby the opposed ramps thereon slidably engage one another and cause limited expansion and contraction of the outer and inner gripping members, respectively.

4. A device according to claim 1, wherein the plurality of slits includes a set of first slits which are spaced circumferentially and extend axially inwardly from one end of each of the gripping members, and a set of second slits which are spaced circumferentially and extend axially inwardly from the other end of each of the gripping members, the first and second slits alternating circumferentially of the respective gripping member so that each axially extending segment is connected at opposite ends to a respective one of the adjacent segments by relatively short integral webs.

5. A device according to claim 4, wherein each of said inner and outer gripping members has an axial length which equals or exceeds the diameter of the inner surface of the inner gripping member.

6. A device according to claim 1, including a housing having means thereon for releasably securing it to a machine, the housing also having an elongated cylindrical bore extending partway therethrough, the radially inner surface of said bore being a smooth cylindrical surface, said outer and inner gripping members being removably disposed within said bore, the outer gripping member having its outer cylindrical surface of a diameter substantially equal to the inside diameter of said bore so that the outer gripping member resiliently radially expands into gripping engagement with the wall defining said bore, the inner cylindrical surface of the inner gripping member being adapted to receive therein and grippingly engage the shank of a tool or workpiece, one of said gripping members having one end thereof disposed in axial abutting engagement with said housing adjacent the inner end of said bore, the other gripping member having the other end thereof positioned adjacent the open end of the bore and defining thereon an actuating surface, and an actuator cap threadably engaged on said housing in surrounding relationship to said bore adjacent the open end thereof, said actuator cap having a radially inwardly projecting portion which engages the actuating surface defined on said other gripping member for effecting axial displacement of said other gripping member.

7. A device according to claim 6, wherein said one end of said one gripping member has a flange which projects radially toward the other gripping member, and spring means cooperable with and disposed between said radial flange on said one gripping member and a surface on the adjacent end of the other gripping member for urging said gripping members relatively axially in a direction opposite said first direction.

8. A device according to claim 7, wherein said spring means comprises a one-piece ring spring disposed in encircling relationship to the inner gripping member.

9. A device according to claim 6, wherein said outer gripping member has an integral sleeve part disposed at one end thereof, said sleeve part projecting axially outwardly beyond the adjacent end of the inner gripping member, said sleeve part having a noncircular opening extending therethrough in alignment with the longitudinal axis of said inner gripping member, said sleeve part also having lug means projecting axially outwardly from the free end thereof and disposed in driving engagement with said housing.

10. A device according to claim 1, wherein said outer gripping member has an integral sleeve part disposed at one end thereof, said sleeve part projecting axially outwardly beyond the adjacent end of the inner gripping member, said sleeve part having a noncircular opening extending therethrough in alignment with the longitudinal axis of said inner gripping member, said sleeve part also having lug means projecting axially outwardly from the free end thereof.

11. The device of claim 1, including resilient means cooperable with said first and second gripping members for urging said one gripping member to move relative to said second gripping member in a direction opposite said first direction, and including means defining cooperating stop surfaces on said first and second gripping members for limiting relative axial movement of said gripping members under the urging of said resilient means.

12. The device of claim 11, wherein one end of said first gripping member extends axially beyond the adjacent end of said second gripping member, and the other end of said second gripping member extends axially beyond the other end of said first gripping member, said second gripping member having a radially outwardly extending flange at said other end thereof, and said resilient means includes a spring cooperable with and disposed between said other end of said first gripping member and said radial flange on said second gripping member.

13. The device according to claim 11, wherein one end of said first gripping member projects axially beyond the adjacent end of said second gripping member and the other end of said second gripping member projects axially beyond the other end of said first gripping member, said first gripping member having a radially inwardly extending flange at said one end thereof, and said resilient means includes a spring cooperable with and disposed between said radial flange on said first gripping member and a surface on the adjacent end of said second gripping member.

14. The device according to claim 13, including at least one axially projecting lug on said one end of said first gripping member, and wherein the radially inner edge of said radially inwardly extending flange on said first gripping member is a square, thereby defining a square opening in said one end of said first gripping member.

15. The tool holder assembly according to claim 6, including lug means projecting from one said gripping member and cooperable with said housing for preventing rotation of said one gripping member relative to said housing.

16. The device according to claim 12 or claim 13, wherein said camming surfaces on said first and second gripping members extend at an angle of approximately 10° with respect to the axis of said first and second gripping members.

17. A tool holder according to the device of claim 13 including:
a rotatable spindle mountable on a machine, and having an elongated cylindrical bore extending part way therethrough, the radially inner surface of said bore being a smooth cylindrical surface;
said outer gripping member having means thereon for effecting a positive rotative driving engagement with said spindle, the outside diameter of said outer gripping member being substantially equal to the inside diameter of said bore, the opening through said outer gripping member having a generally noncylindrical portion for positive rotative driving engagement with a noncylindrical portion of a tap shank, said opening also having a generally cylindrical portion in which said inner gripping member is coaxially supported for axial movement relative to said outer gripping member, and
means for effecting relative axial movement of said inner and outer gripping members.

18. The tool holder according to claim 17, wherein said means for effecting a positive rotative driving engagement of said spindle to said outer gripping member includes at least one axially projecting lug on said outer gripping member received in a recess provided in said spindle.

* * * * *

UNITED STATES PATENT AND TRADEMARK OFFICE
CERTIFICATE OF CORRECTION

PATENT NO. : 4 497 498
DATED : February 5, 1985
INVENTOR(S) : James R. BUCK

It is certified that error appears in the above-identified patent and that said Letters Patent is hereby corrected as shown below:

Column 11, line 11; change "claim 13" to ---claim 1---.

Signed and Sealed this

Sixth Day of August 1985

[SEAL]

Attest:

DONALD J. QUIGG

Attesting Officer     Acting Commissioner of Patents and Trademarks